(12) United States Patent
Gong et al.

(10) Patent No.: US 11,347,399 B2
(45) Date of Patent: May 31, 2022

(54) METHOD, DEVICE, AND COMPUTER PROGRAM PRODUCT FOR EXTENDING PARTITION OF STORAGE SYSTEM

(71) Applicant: EMC IP Holding Company LLC, Hopkinton, MA (US)

(72) Inventors: Yunhai Gong, Shanghai (CN); Wesley Wei Sun, Shanghai (CN); John Guoxin Dong, Shanghai (CN); Stan Feng Huang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/038,628

(22) Filed: Sep. 30, 2020

(65) Prior Publication Data
US 2022/0035534 A1 Feb. 3, 2022

(30) Foreign Application Priority Data
Jul. 31, 2020 (CN) .......................... 202010758934.7

(51) Int. Cl.
*G06F 3/06* (2006.01)

(52) U.S. Cl.
CPC .......... *G06F 3/0611* (2013.01); *G06F 3/0644* (2013.01); *G06F 3/0652* (2013.01); *G06F 3/0659* (2013.01); *G06F 3/0683* (2013.01)

(58) Field of Classification Search
CPC .... G06F 3/0659; G06F 3/0604; G06F 3/0682; G11B 5/00813; G11B 27/107; G11B 27/34; G11B 15/087
See application file for complete search history.

(56) References Cited

U.S. PATENT DOCUMENTS 9,223,517 B1 * 12/2015 Srivastav ................ G06F 3/065

* cited by examiner

*Primary Examiner* — Kalpit Parikh
(74) *Attorney, Agent, or Firm* — Amin, Turocy & Watson, LLP

(57) ABSTRACT

A partition of a storage system is extended in a more effective manner, thereby improving the overall operating efficiency of the storage system. For instance, objects are divided into a first group of objects and a second group of objects, based upon which a first partition including the first group of objects and a second partition including the second group of objects are created. A partition index of the partition is obtained, wherein a group of nodes included in the partition index respectively represents metadata of the group of objects. A first partition index and a second partition index are respectively generated based on the partition index, wherein a first group of nodes included in the first partition index respectively represents metadata of the first group of objects, and a second group of nodes included in the second partition index respectively represents metadata of the first group of objects.

20 Claims, 9 Drawing Sheets

METHOD, DEVICE, AND COMPUTER PROGRAM PRODUCT FOR EXTENDING PARTITION OF STORAGE SYSTEM

RELATED APPLICATION

The present application claims the benefit of priority to Chinese Patent Application No. 202010758934.7, filed on Jul. 31, 2020, which application is hereby incorporated into the present application by reference herein in its entirety.

TECHNICAL FIELD

Implementations of the present disclosure relate to storage management, and more particularly, to a method, a device, and a computer program product for extending a partition of a storage system.

BACKGROUND

With the development of data storage technologies, various data storage devices have been capable of providing users with higher and higher data storage capacities. At present, a concept of distributed storage system has been proposed, and user data can be distributed on various storage devices included in a distributed storage system. Further, while data storage capacities are improved, demands of users for the response time of a storage system are also increasingly high. At present, a technical solution has been developed to partition objects stored in a storage system and use partition indexes to accelerate the data access speed.

With the use of the storage system, storage devices in the storage system may face insufficient storage space. At this point, the storage space in the storage system can be extended. At this moment, partitions in the storage system have to be extended accordingly. How to extend the partitions in the storage system to improve the response speed of the storage system has become a research hotspot.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

Therefore, it is desirable to develop and implement a technical solution for managing partitions in a storage system in a more effective manner. It is desirable that the technical solution is compatible with existing storage systems, and by modifying various configurations of existing storage systems, the storage system may be managed in a more effective manner.

According to a first aspect of the present disclosure, a method for extending a partition of a storage system is provided. The storage system includes at least one partition, and a partition of the at least one partition includes a group of objects. In this method, a group of objects is divided into a first group of objects and a second group of objects. A first partition and a second partition are created based on the first group of objects and the second group of objects, wherein the first partition includes the first group of objects, and the second partition includes the second group of objects. A partition index of the partition is obtained, wherein a group of nodes included in the partition index respectively represents metadata of the group of objects. A first partition index and a second partition index are respectively generated based on the partition index. A first group of nodes included in the first partition index respectively represents metadata of the first group of objects, and a second group of nodes included in the second partition index respectively represents metadata of the first group of objects.

According to a second aspect of the present disclosure, an electronic device is provided. The electronic device includes: at least one processor; a volatile memory; and a memory coupled to the at least one processor. The memory has instructions stored therein. When executed by the at least one processor, the instructions cause the device to execute actions for extending a partition of a storage system. The storage system includes at least one partition, and a partition of the at least one partition includes a group of objects. The actions include: dividing the group of objects into a first group of objects and a second group of objects; creating a first partition and a second partition based on the first group of objects and the second group of objects, wherein the first partition includes the first group of objects and the second partition includes the second group of objects; obtaining a partition index of the partition, wherein a group of nodes included in the partition index respectively represents metadata of the group of objects; and generating a first partition index and a second partition index based on the partition index, wherein a first group of nodes included in the first partition index respectively represents metadata of the first group of objects, and a second group of nodes included in the second partition index respectively represents metadata of the first group of objects.

According to a third aspect of the present disclosure, a computer program product is provided. The computer program product is tangibly stored on a non-transitory computer-readable medium and including machine-executable instructions that are used to implement the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example rather than limitation. In the accompanying drawings.

DETAILED DESCRIPTION

Hereinafter, implementations of the present disclosure will be described in more detail with reference to the accompanying drawings. Although implementations of the present disclosure are shown in the accompanying drawings, it should be understood that the present disclosure can be implemented in various forms and should not be limited by the implementations set forth herein. Rather, these implementations are provided so that the present disclosure will be more thorough and complete, and the scope of the present disclosure will be fully conveyed to those skilled in the art.

As used herein, the term "include" and variations thereof mean open-ended inclusion, that is, "including but not limited to." Unless specifically stated, the term "or" indicates "and/or." The term "based on" means "based at least in part on." The terms "one example implementation" and "one implementation" mean "at least one example implementation." The term "another implementation" means "at least one further implementation." The terms "first," "second," etc. may refer to different or the same objects. Other explicit and implicit definitions may also be included below.

Figure 1:
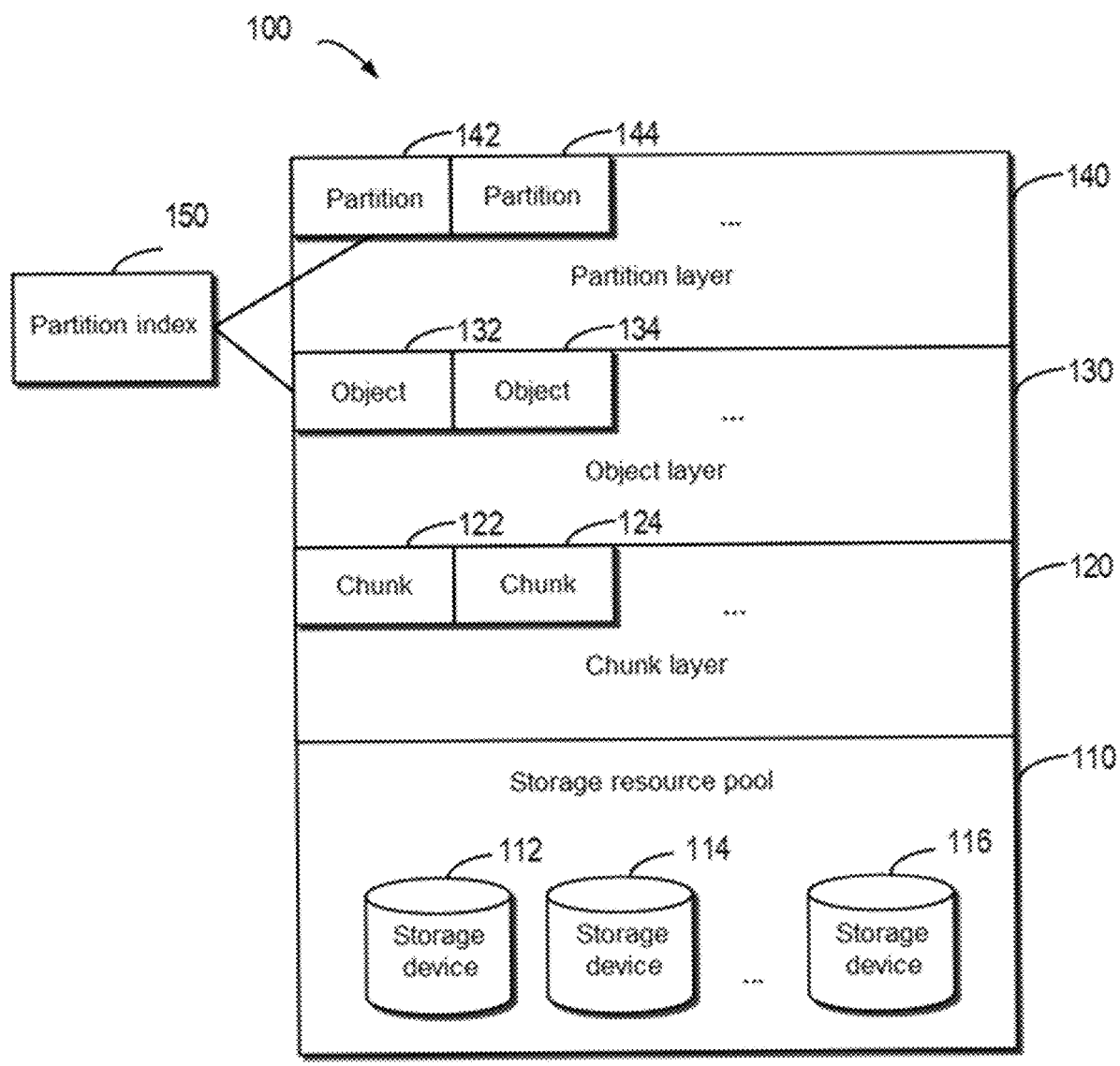
FIG. 1 schematically shows a block diagram of a storage system in which a method of the present disclosure may be implemented.

A variety of storage systems have been developed at present. For example, an object-oriented storage system can store user data in a unit of objects. The objects here may be, for example, images, videos, audios, or data in other formats. The objects can be divided into one or more chunks and stored based on the chunks. Specifically, FIG. 1 schematically shows block diagram 100 of a storage system in which a method of the present disclosure may be implemented. As shown in FIG. 1, storage resource pool 110 may be provided, and storage resource pool 110 may include a plurality of storage devices 112, 114, . . . , and 116. Although the plurality of independent physical storage devices 112, 114, . . . , and 116 are shown here, the storage devices may also be virtual storage devices according to an example implementation of the present disclosure.

Chunk layer 120 may be established over storage resource pool 110. The chunk layer may include a plurality of chunks 122 and 124 and so on. For different storage systems, the chunks may be set to different sizes. Object layer 130 may be established over chunk layer 120, and object layer 130 is visible to users of storage system 100. Here, based on content stored in objects, the objects may include one or more chunks. For example, object 132 may include two chunks (such as chunk 122 and chunk 124), and for another example, object 134 may include only one chunk.

As storage system 100 runs, storage system 100 may include a large number of objects. In order to facilitate the management of various objects in storage system 100, the plurality of objects in object layer 130 may be divided into corresponding partitions based on a Distributed Hash Table (DHT). For example, partition layer 140 may include partitions such as partition 142 and partition 144. The number of the partitions may be set based on the configuration of storage system 100. For example, the number of the partitions may be set to 128 or other values. At this moment, a partition may include one or more objects.

In order to facilitate the management of various objects in the partitions, partition index 150 may be established to store metadata associated with the objects, so as to access the objects in the storage system in a fast and effective manner. It will be understood that FIG. 1 only schematically shows partition index 150 for partition 142. For each partition in partition layer 140, a corresponding index may be established. Further, one or more node devices may run a partition manager to manage the objects in each partition. It will be understood that the node devices here may be, for example, storage devices 112, 114, . . . , and 116. Alternatively and/or additionally, the node devices may be other devices with a processing capability in storage system 100.

As the storage system runs, the storage space in the storage system may become insufficient. At this moment, new storage devices may be added to the storage system to extend the storage space. During the subsequent operation of the storage system, it is necessary to extend the partitions to better manage objects in the newly added storage space. At present, a technical solution of re-dividing partitions for objects in a storage system has been proposed. However, during this period, the storage system's services have to be stopped. The downtime of the storage system will result in users not being able to access the objects in the storage system, which will result in service interruption. Therefore, it is desirable to provide a technical solution for extending a partition in a more effective manner.

Figure 2:
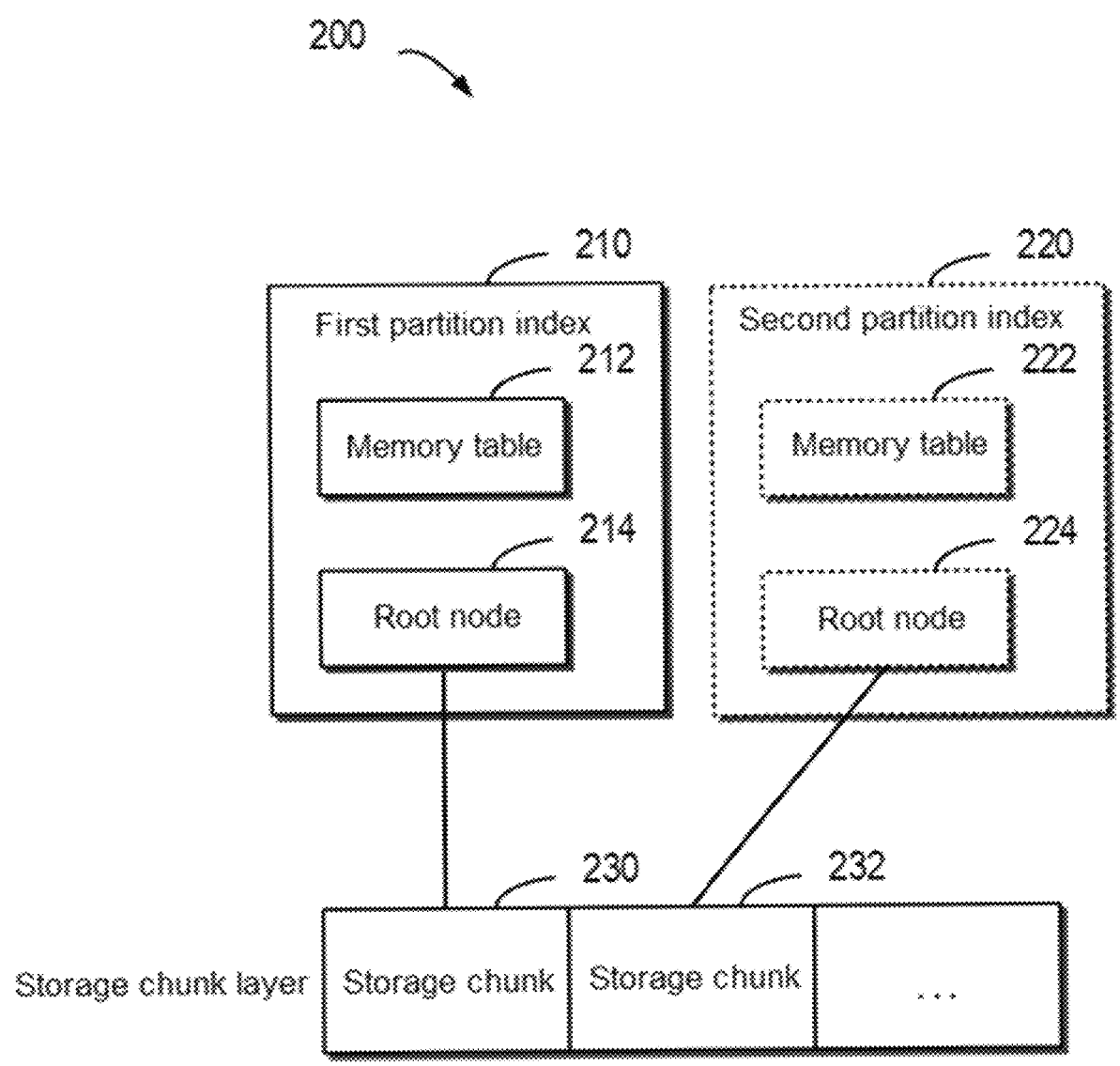
FIG. 2 schematically shows a block diagram of a process for extending a partition of a storage system according to an implementation of the present disclosure.

In order to overcome the above defects, implementations of the present disclosure provide a method, a device, and a computer program product for extending a partition of a storage system. First, an overview according to an example implementation of the present disclosure will be described with reference to FIG. 2. FIG. 2 schematically shows block diagram 200 of a process for extending a partition of a storage system according to an implementation of the present disclosure. The storage system may include at least one partition, and a partition of the at least one partition includes a group of objects. In the following, a technical solution of how to extend an existing partition into two partitions will be described. According to an example implementation of the present disclosure, each partition may be processed in a similar way.

According to the example implementation of the present disclosure, a group of objects in an original partition may be divided into a first group of objects and a second group of objects, and a first partition and a second partition may be created for the first group of objects and the second group of objects respectively. Further, first partition index 210 and second partition index 220 may be created respectively based on a partition index of the original partition, so as to manage the objects in each partition.

According to an example implementation of the present disclosure, the index of the original partition may be used as first partition index 210, and second partition index 220 may be created by means of replication. In subsequent steps, first partition index 210 and second partition index 220 may be updated to form final first partition index 210 and final second partition index 220. With the example implementation of the present disclosure, the partition index of the original partition may be fully utilized to create first partition index 210 and second partition index 220. After the two partition indexes have been created, the newly created two partition indexes may be used to serve an access request for the original partition. In this way, the partitions in the storage system may be extended in a faster and more effective manner, and the corresponding partition indexes may be generated.

According to the example implementation of the present disclosure, the partition index may include a tree index and a memory table. Here, the tree index may be stored in a physical storage chunk in the storage system, and a root node of the tree index may be used to access the tree index. The tree index may include a root node for identifying the partition index. The tree index may include leaf nodes for storing metadata of objects. Here, the leaf nodes may store the metadata of the objects in a key-value form. The key represents an identifier of an object, and the value represents metadata of the object. Here, the metadata may include, for example, an address of each chunk included in the objects, types of the objects, update time of the objects, and the like. The tree index may include one or more levels, where non-leaf nodes are used as index nodes. For example, the leaf nodes may be pointed to based on binary trees, multi-way trees, and B+ trees. The memory table is used to cache a changed part in the tree index (i.e., dirty data), and data in the memory table may be flushed to physical storage chunks for storing the tree index at predetermined time intervals and/or based on other trigger conditions.

As shown in FIG. 2, generated first partition index 210 may include memory table 212 and root node 214. Root node 214 represents the root node of the tree index and points to storage chunk 230 in the storage chunk layer of the storage system. Storage chunk 230 includes the tree index. Similarly, generated second partition index 220 may include memory table 222 and root node 224. Root node 224 represents the root node of the tree index and points to storage chunk 232 in the storage chunk layer of the storage system.

Figure 3:
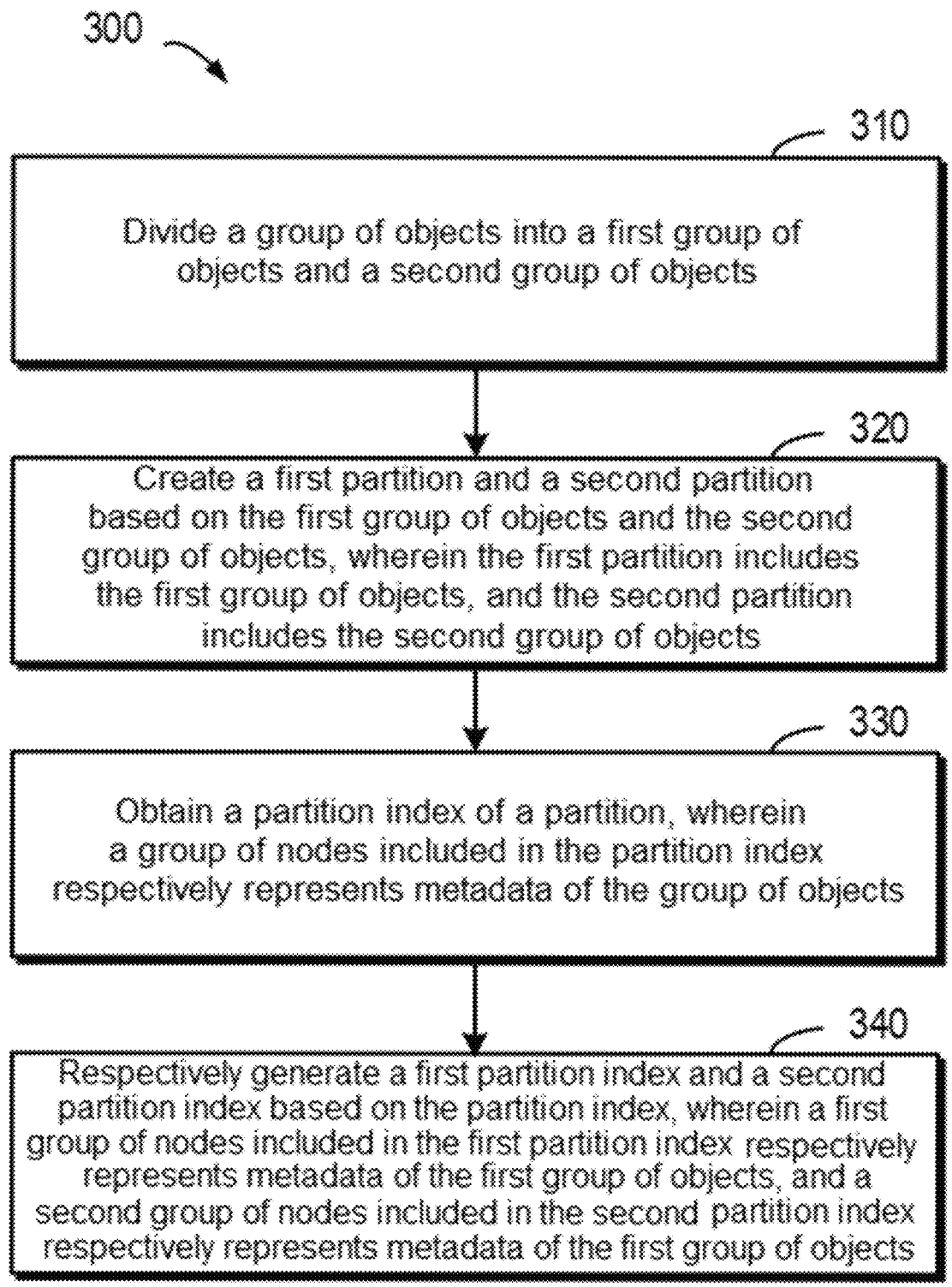
FIG. 3 schematically shows a flow chart of a method for extending a partition of a storage system according to an implementation of the present disclosure.

Hereinafter, how to generate first partition index 210 and second partition index 220 based on the original partition will be described in detail with reference to FIG. 3. FIG. 3 schematically shows a flow chart of method 300 for extending a partition of a storage system according to an implementation of the present disclosure. At this moment, the storage system may include one or more partitions, and method 300 may be executed for each partition. It will be understood that a partition manager may be utilized to perform various operations related to managing the partitions. At this moment, the function of an original partition manager may be extended to execute method 300. According to an example implementation of the present disclosure, the partition manager may be deployed at a dedicated management node. Alternatively and/or additionally, the partition manager may be deployed in a storage node for accommodating storage devices in the storage system.

According to the example implementation of the present disclosure, second partition index 220 may be stored in a management node where the original partition is located. In this way, all operations of method 300 are performed locally at the management node, thereby avoiding network overhead caused by the extension operation.

According to an example implementation of the present disclosure, method 300 may be performed in response to extension of the storage capacity of the storage system. More storage capacities will accommodate more objects, and method 300 may be performed to obtain more partitions, so as to process the access to the objects in each partition in parallel.

According to an example implementation of the present disclosure, method 300 may be performed in response to extension of the parallel access capability of the storage system. It will be understood that the management of each partition is parallel, so extending the number of the partitions helps to improve the parallel access capability of the entire storage system. Even if the storage capacity in the storage system does not change, providing more partitions helps to process access requests for the storage system with a higher degree of parallelism, thereby improving the response efficiency of the storage system. According to an example implementation of the present disclosure, method 300 may be performed based on the extension of both the storage capacity and parallel access capability of the storage system.

As shown in FIG. 3, at block 310, a group of objects is divided into a first group of objects and a second group of objects. The group of objects here is objects in an original partition. According to an example implementation of the present disclosure, the objects in the original partition may be divided into two parts, and new partitions may be generated for the two parts respectively. According to an example implementation of the present disclosure, a dividing way may be determined based on various ways. Assuming that the storage system includes 128 ($2^7$) partitions, each partition may be extended into 2 partitions respectively, and the extended storage system will include 256 ($2^8$) partitions. At this moment, an identifier of a partition may be extended from 7 bits to 8 bits.

Assuming that an identifier of the original partition is represented by k bits, the identifier of the partition after extension is represented by k+1 bits. For an object in the group of objects, an extended hash value of the object (i.e., the hash value of k+1 bits) may be determined based on a hash function associated with the partition, and the extended hash value may be compared with the original hash value (i.e., the hash value of k bits) to determine how to divide the first group of objects and the second group of objects. As shown in Formula 1 below, if it is determined that the extended hash value is the same as the hash value of the object, the object may be divided into the first group of objects. As shown in Formula 2 below, if it is determined that the extended hash value is different from the hash value, the object is divided into the second group of objects. It will be understood that the length of the hash value here is less than that of the extended hash value. Specifically, the first group of objects and the second group of objects may be determined based on Formulas 1 and 2 below.

$$\text{Hash Function(Object key)} \& (2^k-1) == \text{Hash Function (Object key)} \& (2^{k+1}-1) \qquad \text{Formula 1}$$

$$\text{Hash Function(Object key)} \& (2^k-1) != \text{Hash Function (Object key)} \& (2^{k+1}-1) \qquad \text{Formula 2}$$

Hash Function represents the hash function associated with the partition, Object key represents a key word of the object in the partition, k represents the number of bits of the hash value before extension, and k+1 represents the number of bits of the extended hash value after extension. According to an example implementation of the present disclosure, the hash function may be independent of the partition. In this way, the problem of mapping objects in the original partition to another partition can be eliminated, thereby improving the parallel processing efficiency of each partition. Using the example implementation of the present disclosure, it is possible to quickly determine how to divide a group of objects in the original partition based on Formulas 1 and 2 described above. It will be understood that above Formulas 1 and 2 are merely illustrative. According to an example implementation of the present disclosure, the object may be divided into the first group of objects based on Formula 2, and the object may be divided into the second group of objects based on Formula 1.

At block 320, a first partition and a second partition are created based on the first group of objects and the second group of objects. The first partition includes the first group of objects and the second partition includes the second group of objects. In the case where the original group of objects has been divided into two groups of objects, a corresponding partition may be created for each group of objects. In subsequent steps, first partition index 210 and second partition index 220 may be created for the first partition and the second partition respectively. First partition index 210 and second partition index 220 may be created based on sharing the partition index of the original partition. In the following, how to obtain the partition index of the original partition will be described with reference to block 330 in FIG. 3 first.

At block 330, the partition index of the partition is obtained, and a group of nodes included in the partition index here respectively represents metadata of a group of objects. As described above, the partition index may include the memory table and the root node of the tree index. At this moment, since the memory table caches dirty data that has not been flushed to the physical storage chunk, the data in the memory table of the partition should first be flushed to a storage chunk corresponding to the partition in the chunk layer of the storage system. With the example implementation of the present disclosure, it can be ensured that the storage chunks in the chunk layer include the latest tree index.

Figure 4:
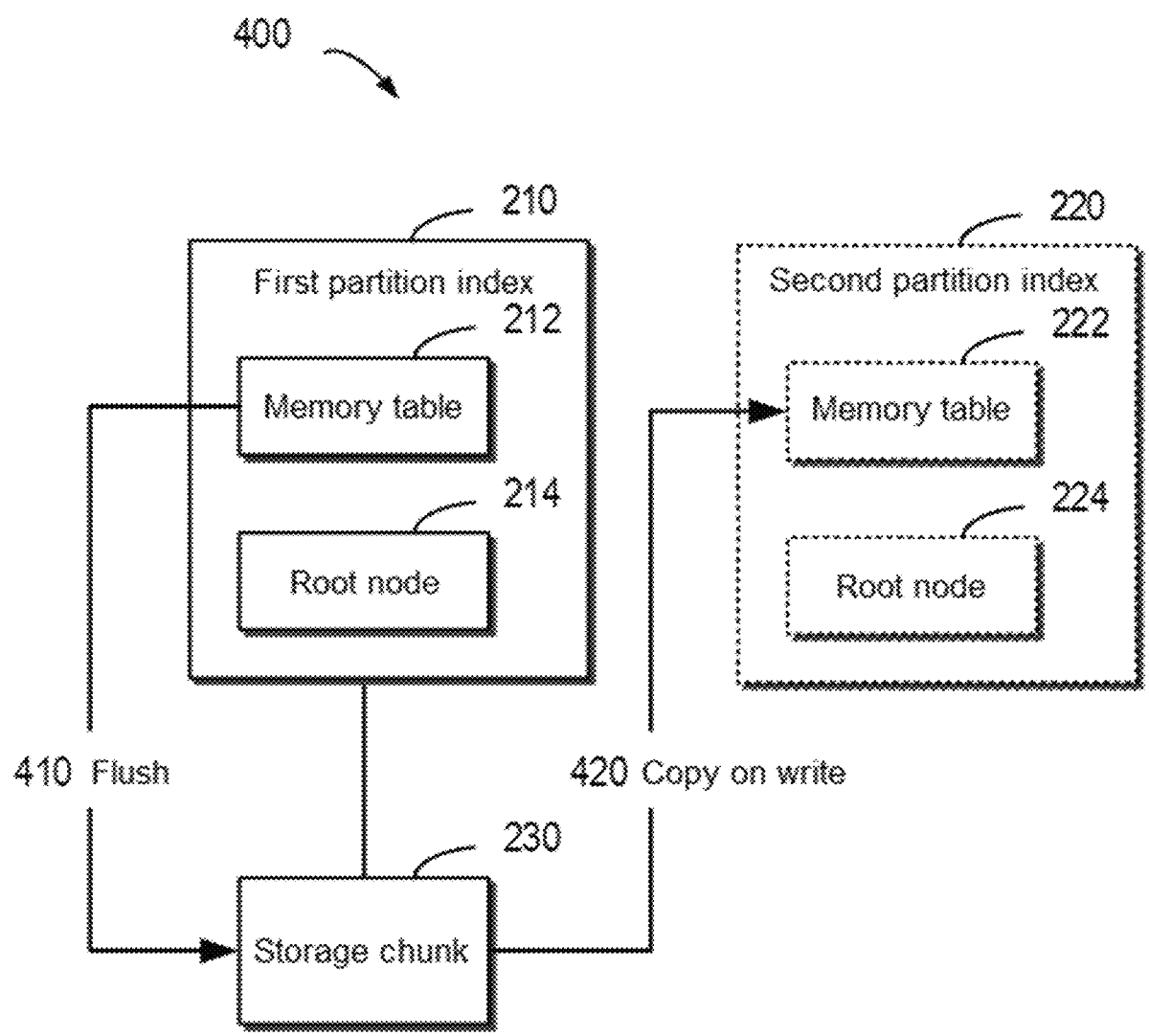
FIG. 4 schematically shows a block diagram of a process for obtaining a partition index of a storage system according to an implementation of the present disclosure.

FIG. 4 schematically shows block diagram 400 of a process for obtaining a partition index of a storage system according to an implementation of the present disclosure. In FIG. 4, as indicated by arrow 410, the dirty data in memory table 212 may be flushed to storage chunk 230 to ensure that storage chunk 230 includes the latest tree index at this moment. Then, the data in storage chunk 230 may be copied to create second partition index 220.

At block 340, first partition index 210 and second partition index 220 are respectively generated based on the partition index. Here, a first group of nodes included in first partition index 210 respectively represents metadata of the first group of objects, and a second group of nodes included in second partition index 220 respectively represents metadata of the first group of objects. First, how to generate second partition index 220 based on the partition index is introduced. It will be understood that the second partition includes only the second group of objects, and thus the second partition index may be determined based on the nodes in the partition index corresponding to the second group of objects. As indicated by arrow 420, data associated with the second group of objects in storage chunk 230 may be copied to memory table 222 of second partition index 220 based on a copy on write technology.

Figure 5:
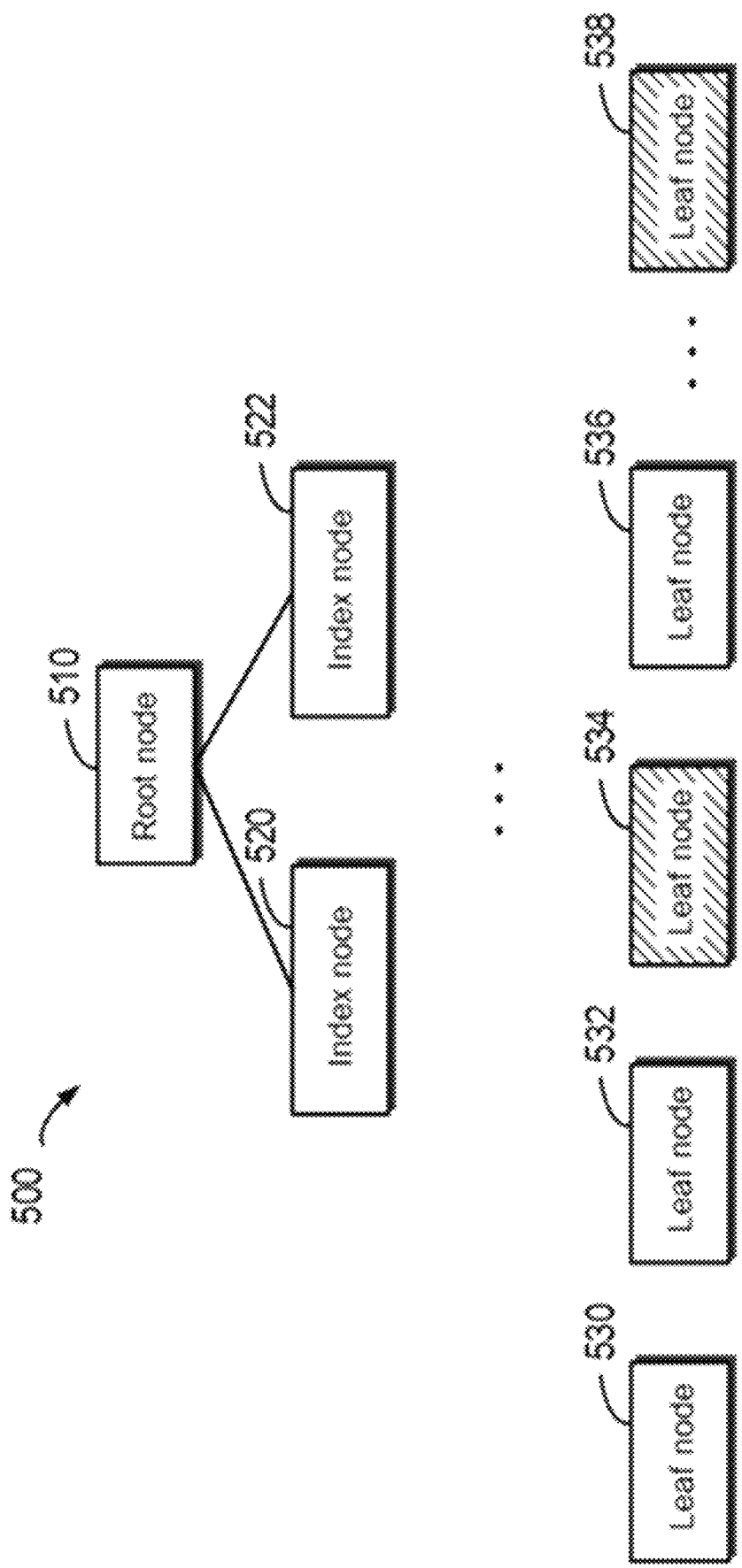
FIG. 5 schematically shows a block diagram of a tree index according to an implementation of the present disclosure.
Figure 6:
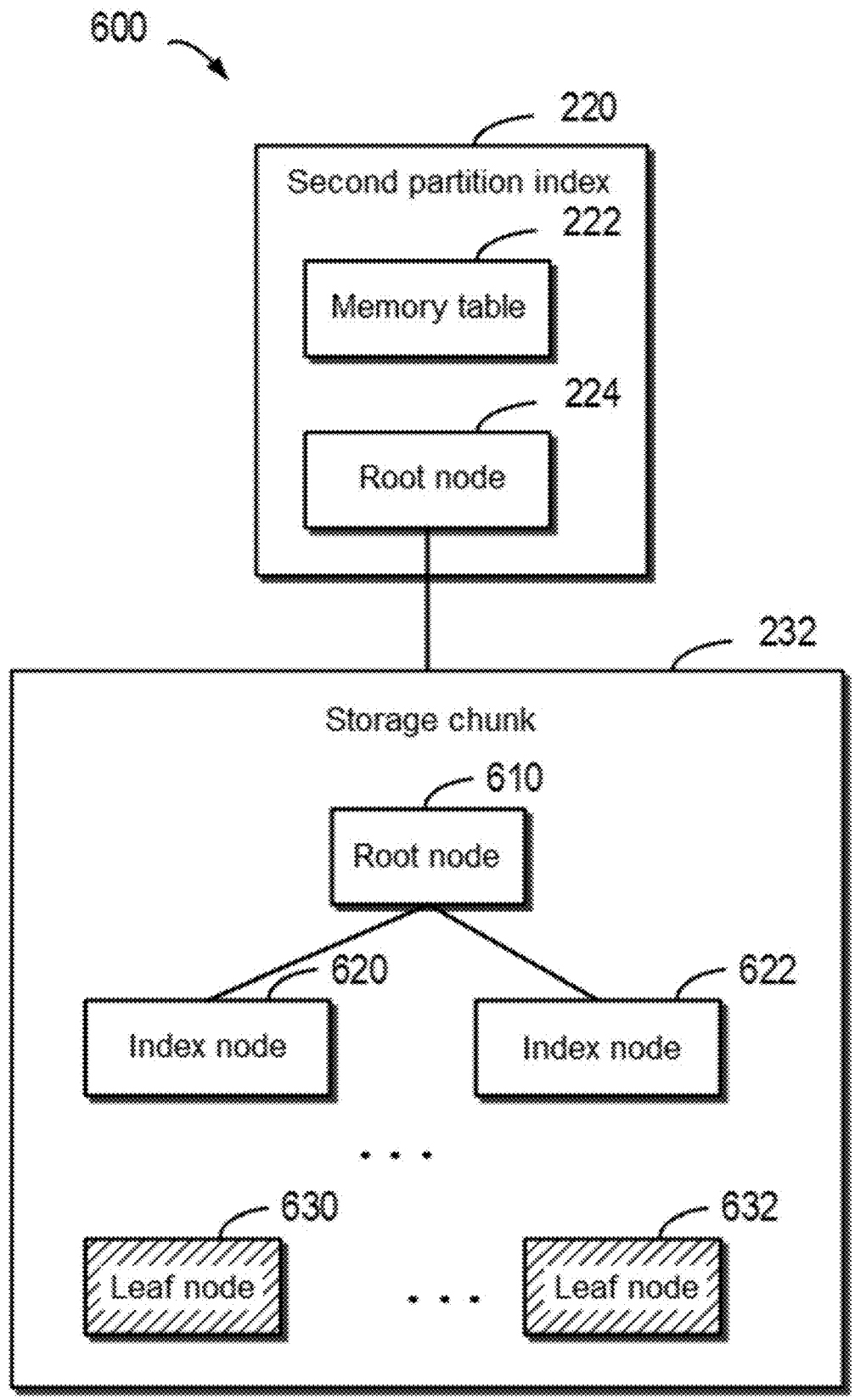
FIG. 6 schematically shows a block diagram of a second partition index according to an implementation of the present disclosure.

Hereinafter, how to generate second partition index 220 will be described with reference to FIGS. 5 and 6. FIG. 5 schematically shows block diagram 500 of a tree index according to an implementation of the present disclosure. As shown in FIG. 5, the tree index may include root node 510, index nodes 520 and 522, and a plurality of leaf nodes 530, 532, 534, 536, . . . , and 538. It will be understood that FIG. 5 only schematically shows two index nodes 520 and 522, and according to an example implementation of the present disclosure, the tree index may include more levels and include more index nodes. The first group of objects (represented by blank chunks) and the second group of objects (represented by striped chunks) may be respectively determined based on Formula 1 and Formula 2 described above. Here, the first group of objects includes objects corresponding to leaf nodes 530, 532, and 536, and the second group of objects includes objects corresponding to leaf nodes 534 and 538.

Specifically, the nodes corresponding to the second group of objects may be read from the tree index stored in storage chunk 230 based on a copy on write process. As shown in FIG. 5, leaf nodes 534 and 538 may be read from storage chunk 230. Then, the read nodes may be updated based on the second group of objects, and the updated nodes may be written into the memory table of the second partition index. It is assumed that leaf node 534 in the tree index includes a key-value pair (key1, value1), where key1 is a hash value of an object represented by k bits, and value1 represents related metadata. An extended hash value key2 of the object may be used to update key1, where key2 is the extended hash value represented by k+1 bits. After the copy on write operation, the key-value pair corresponding to the object in memory table 222 will be updated to (key2, value1).

A similar operation may be performed on each object in the second group of objects in order to include updated metadata about each object in memory table 222. Then, memory table 222 of second partition index 220 may be flushed to storage chunk 232 corresponding to the second partition in the chunk layer of the storage system to generate second partition index 220. FIG. 6 schematically shows block diagram 600 of a second partition index according to an implementation of the present disclosure. As shown in the figure, all data in memory table 222 has been refreshed to storage chunk 222 at this moment, and root node 224 may point to storage chunk 232. Storage chunk 232 includes a tree index. The tree index may include root node 610, index nodes 620, 622, etc., and updated leaf nodes 630 and 632.

At this moment, leaf node 630 corresponds to original leaf node 534, and leaf node 632 corresponds to original leaf node 538. "Key" fields in leaf nodes 630 and 632 have been updated to k+1 bits, and "value" fields store metadata associated with each object. Using the example implementation of the present disclosure, the copy on write technology can ensure that second partition index 220 is quickly generated. In this way, the operating efficiency of the storage system can be greatly improved and the interference of the extension process to normal user access can be reduced.

It will be understood that, in order to ensure data consistency before and after the extension, processing of an access request for the partition may be stopped before reading the nodes corresponding to the second group of objects. In other words, during the reading of the nodes associated with the second group of objects from storage chunk 230, the access request for the partition should be suspended to avoid changes of the partition index due to modifications of the objects. It will be understood that since the second group of objects only includes at most half of the objects in the original partition at this moment, the read operation will not cause a long time overhead. Generally speaking, the read operation only lasts a few milliseconds. Compared with the prior art that requires a long downtime, the downtime of the storage system can be greatly reduced, thereby reducing the impact on user access operations.

According to an example implementation of the present disclosure, method 300 may be executed in a management process at a partition management node for managing partitions. In this way, the management process may directly execute the copy on write process, which will further reduce the time taken by the copy process.

How to generate second partition index 220 has been described above with reference to FIGS. 5 and 6. Hereinafter, how to generate first partition index 210 will be described with reference to FIGS. 5 and 7. After the partition index in storage chunk 230 has been read, the nodes representing the metadata of the objects in the second group of objects in the partition index are set to be invalid. In this way, first partition index 210 may be generated. It will be understood that in the context of the present disclosure, a partition index may be an additional index. When an object has been divided into another partition, a leaf node associated with the object cannot be deleted, but the leaf node can be marked as an invalid node.

Figure 7:
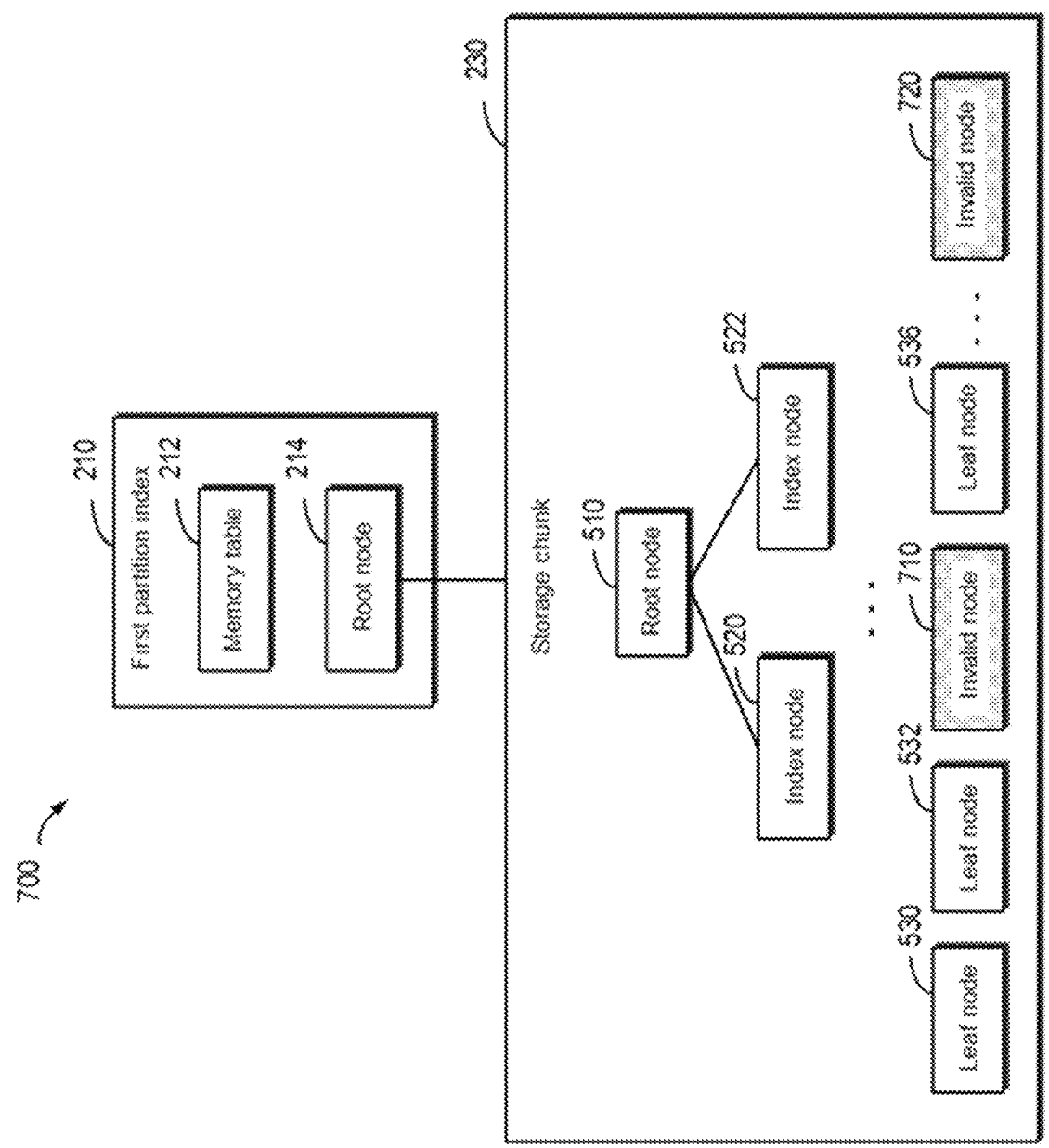
FIG. 7 schematically shows a block diagram of a first partition index according to an implementation of the present disclosure.

For example, the objects corresponding to leaf nodes 534 and 538 in FIG. 5 have been divided into the second partition. At this moment, leaf nodes 534 and 538 can be set as invalid nodes. The above operations may be performed in memory table 212 of first partition index 210, and after the leaf nodes of all the objects in the second group of objects have been marked as invalid, the dirty data in memory table 212 are flushed to storage chunk 230. Hereinafter, more details will be shown with reference to FIG. 7. FIG. 7 schematically shows block diagram 700 of a first partition index according to an implementation of the present disclosure.

As shown in FIG. 7, storage chunk 230 may include root node 510, index nodes 520 and 522, and a plurality of leaf nodes. At this moment, there are two types of leaf nodes: valid nodes (for example, leaf nodes 530, 532, and 536), representing the metadata of the first group of objects included in the first partition; and invalid nodes (for example, nodes 710 and 720), representing that the second group of objects has been deleted from the first partition. Using the example implementation of the present disclosure, the leaf nodes corresponding to the second group of objects are directly marked as invalid, and metadata about objects that have been removed can be quickly deleted from first partition index 210. In this way, the efficiency of extending the partition can be greatly improved.

Figure 8:
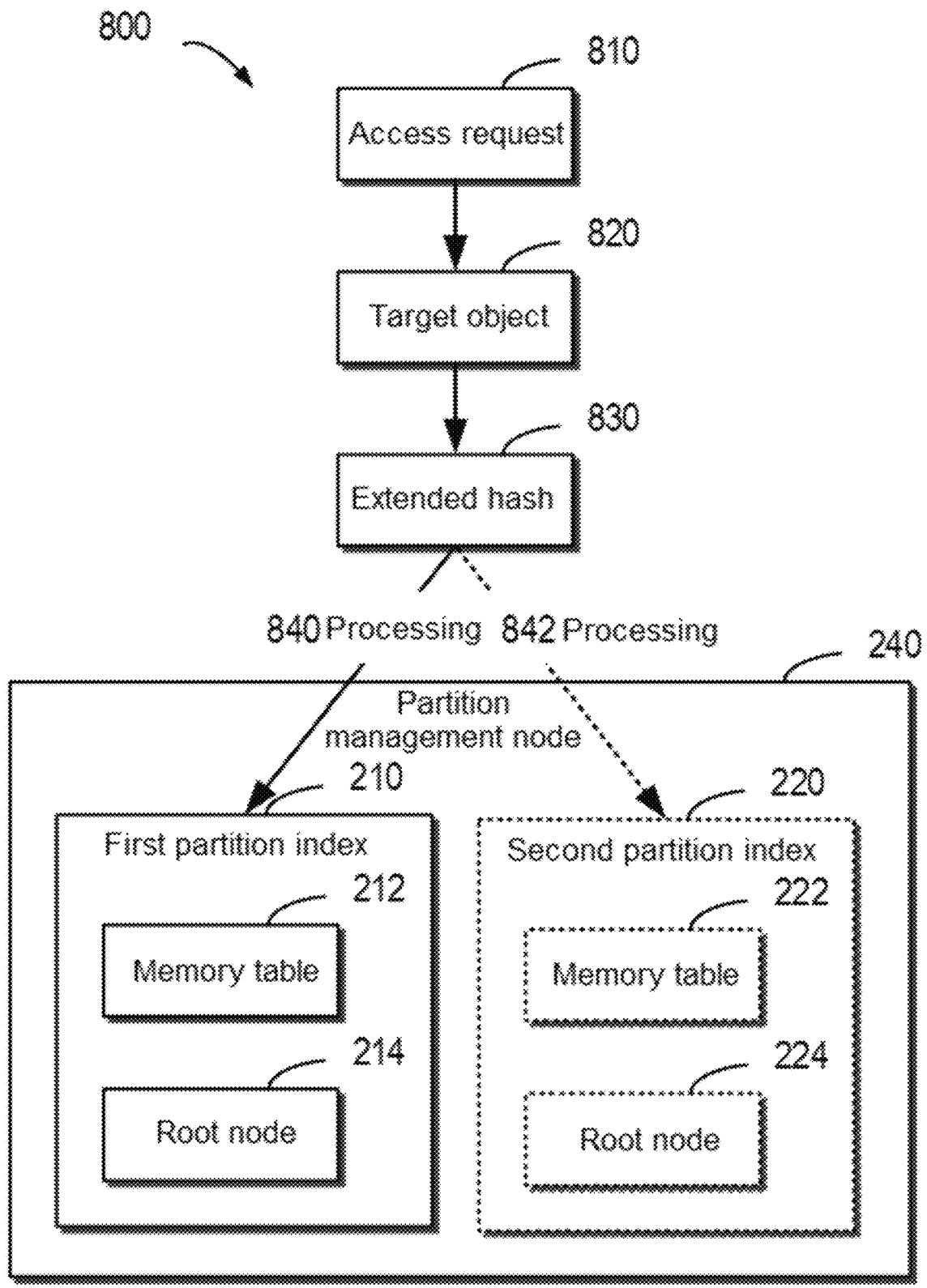
FIG. 8 schematically shows a block diagram of a process for processing an access request based on an extended partition according to an implementation of the present disclosure.

The above has described how to extend the original partition into the first partition and the second partition, and generate corresponding first partition index 210 and second partition index 220. In the case where first partition index 210 and second partition index 220 have been successfully generated, processing of the access request for the storage system may be resumed based on first partition index 210 and second partition index 220. At this moment, the extended two partition indexes may be used to serve the access request. FIG. 8 schematically shows block diagram 800 of a process for processing an access request based on an extended partition according to an implementation of the present disclosure.

As shown in FIG. 8, access request 810 may be received, and a keyword of target object 820 desired to be accessed may be determined from access request 810. An extended hash value of the target object involved in the access request may be determined based on a hash function. It will be understood that since the original partition has been divided into the first partition and the second partition, it is necessary to determine a target partition where the target object is located from the first partition and the second partition based on the extended hash value. Assuming that the target object is in the first partition, as shown by arrow 840, access request 810 may be processed based on first partition index 210. Assuming that the target object is in the second partition, as shown by arrow 842, access request 810 may be processed based on second partition index 220.

With the example implementation of the present disclosure, the newly created partition index may be used to serve the access request from users. In this way, as the storage capacity and/or parallel access capability in the storage system extend/extends, more partitions and corresponding partition indexes may be created.

It will be understood that the above only schematically shows the process of how to create two new partitions and corresponding partition indexes based on one original partition. According to an example implementation of the present disclosure, method 300 may be executed for each of a plurality of existing partitions. Assuming that the storage system includes 128 partitions, the partitions may be processed one by one to generate 256 partitions and corresponding partition indexes.

It will be understood that the above only schematically shows the process of extending one original partition into two new partitions. According to an example implementation of the present disclosure, one original partition may also be extended into more partitions. For example, one original partition may be extended into 4 partitions, and at this moment, an identifier of the extended partition may include k+2 bits; and one original partition may be extended into 8 partitions, and at this moment, an identifier of the extended partition may include k+3 bits, and so on. Those skilled in the art can determine formulas related to more partitions based on Formula 1 and Formula 2 described above, which will not be repeated in the following.

Examples of the method according to the present disclosure have been described in detail above with reference to FIGS. 2 to 8, and implementations of a corresponding apparatus will be described below. According to an example implementation of the present disclosure, an apparatus for extending a partition of a storage system is provided. The storage system includes at least one partition, and a partition of the at least one partition includes a group of objects. The apparatus includes: a dividing module, configured to divide the group of objects into a first group of objects and a second group of objects; a creating module, configured to create a first partition and a second group of objects based on the first group of objects and the second group of objects, wherein the first partition includes a first group of objects and the second partition includes a second group of objects; an obtaining module, configured to obtain a partition index of the partition, wherein a group of nodes included in the partition index respectively represents metadata of the group of objects; and a generating module, configured to generate a first partition index and a second partition index based on the partition index, wherein a first group of nodes included in the first partition index respectively represents metadata of the first group of objects, and a second group of nodes included in the second partition index respectively represents metadata of the first group of objects. According to an example implementation of the present disclosure, modules configured to perform other steps in method 300 are further provided.

Figure 9:
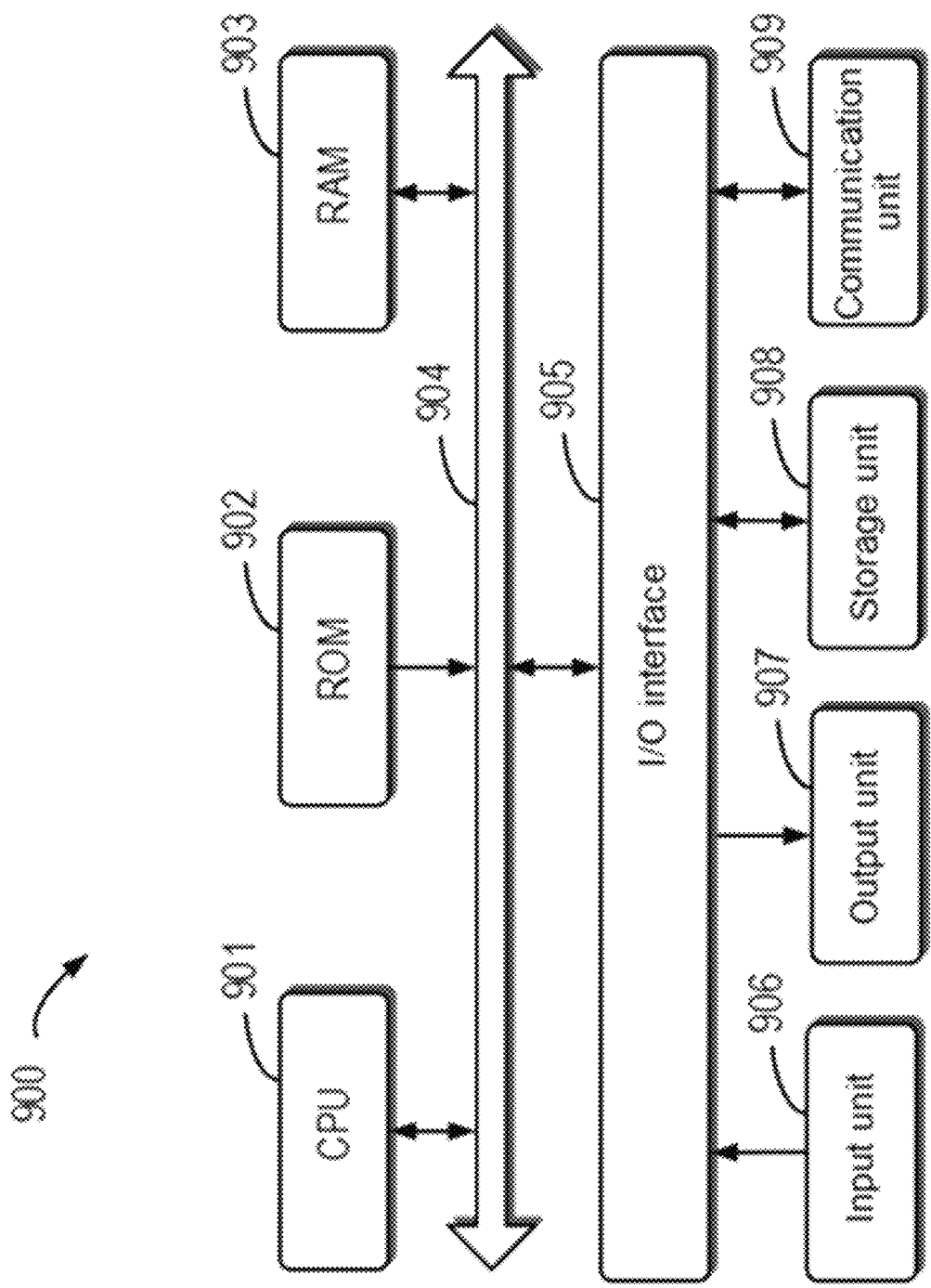
FIG. 9 schematically shows a block diagram of a device for extending a partition of a storage system according to an example implementation of the present disclosure.

FIG. 9 schematically shows a block diagram of device 900 for extending a partition of a storage system according to an example implementation of the present disclosure. As shown in the figure, device 900 includes central processing unit (CPU) 901 that may perform various appropriate actions and processing according to a computer program instruction stored in read-only memory (ROM) 902 or a computer program instruction loaded from storage unit 908 into random access memory (RAM) 903. In RAM 903, various programs and data necessary for the operation of storage device 900 may also be stored. CPU 901, ROM 902, and RAM 903 are connected to each other through bus 904. Input/output (I/O) interface 905 is also connected to bus 904.

A plurality of components in device 900 are connected to I/O interface 905, including: input unit 906, such as a keyboard and a mouse; output unit 907, such as various types of displays and speakers; storage unit 908, such as a magnetic disk and an optical disk; and communication unit 909, such as a network card, a modem, and a wireless communication transceiver. Communication unit 909 allows device 900 to exchange information/data with other devices over a computer network such as the Internet and/or various telecommunication networks.

The various processes and processing described above, such as method 300, may be performed by processing unit 901. For example, in some implementations, method 300 may be implemented as a computer software program that is tangibly included in a machine-readable medium, such as storage unit 908. In some implementations, some or all of the computer program may be loaded and/or installed onto device 900 via ROM 902 and/or communication unit 909. One or more steps of method 300 described above may be performed when the computer program is loaded into RAM 903 and executed by CPU 901. Alternatively, in other implementations, CPU 901 may also be configured in any other suitable manner to implement the above processes/methods.

According to an example implementation of the present disclosure, there is provided an electronic device. The electronic device includes: at least one processor; a volatile memory; and a memory coupled to the at least one processor. The memory has instructions stored therein. When executed by the at least one processor, the instructions cause the device to execute actions for extending a partition of a storage system. The storage system includes at least one partition, and a partition of the at least one partition includes a group of objects. The actions include: dividing the group of objects into a first group of objects and a second group of objects; creating a first partition and a second partition based on the first group of objects and the second group of objects, wherein the first partition includes the first group of objects and the second partition includes the second group of objects; obtaining a partition index of the partition, wherein a group of nodes included in the partition index respectively represents metadata of the group of objects; and generating a first partition index and a second partition index based on the partition index, wherein a first group of nodes included in the first partition index respectively represents metadata of the first group of objects, and a second group of nodes included in the second partition index respectively represents metadata of the first group of objects.

According to an example implementation of the present disclosure, obtaining the partition index of the partition includes: flushing data in a memory table of the partition to a storage chunk corresponding to the partition in a storage chunk layer of the storage system; and reading the partition index from the storage chunk.

According to an example implementation of the present disclosure, generating the second partition index based on the partition index includes: determining the second partition index based on a node in the partition index corresponding to the second group of objects.

According to an example implementation of the present disclosure, determining the second partition index includes: reading the node corresponding to the second group of objects from the partition index based on a copy on write process; updating the read node based on the second group of objects to write the updated node into a memory table of the second partition index; and flushing the memory table of the second partition index to the storage chunk corresponding to the second partition in the storage chunk layer of the storage system to generate the second partition index.

According to an example implementation of the present disclosure, determining the second partition index further includes: stopping processing of an access request for the partition before reading the node corresponding to the second group of objects.

According to an example implementation of the present disclosure, the partition index is an additional index, and generating the first partition index based on the partition index includes: after the partition index has been read, a node in the partition index representing metadata of the objects in the second group of objects is set to be invalid to generate the first partition index.

According to an example implementation of the present disclosure, the method further includes: resuming processing of the access request for the storage system based on the first partition index and the second partition index.

According to an example implementation of the present disclosure, resuming the access request for the partition includes: determining an extended hash value of a target object involved in the access request based on a hash function associated with the partition; based on the extended hash value, determining a target partition where the target object is located from the first partition and the second partition; and processing the access request based on an index of the target partition.

According to an example implementation of the present disclosure, dividing the group of objects into the first group of objects and the second group of objects includes: for an object in the group of objects, determining an extended hash value of the object based on the hash function associated with the partition; in response to a determination that the extended hash value is the same as a hash value of the object, classifying the object into the first group of objects, wherein the length of the hash value is less than that of the extended hash value; and in response to a determination that the extended hash value is different from the hash value, classifying the object into the second group of objects.

According to an example implementation of the present disclosure, the device is implemented in a management process at a partition management node for managing the partitions, and the device is invoked in response to at least any one of the following: extension of the storage capacity of the storage system; and extension of the parallel access capability of the storage system.

According to an example implementation of the present disclosure, there is provided a computer program product tangibly stored on a non-transitory computer-readable medium and including machine-executable instructions that are used to implement the method according to the present disclosure.

According to an example implementation of the present disclosure, there is provided a computer-readable medium. The computer-readable medium stores machine-executable instructions that, when executed by at least one processor, cause the at least one processor to implement the method according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used here is not construed as transient signals themselves, such as radio waves or other freely propagating electromagnetic waves, electromagnetic waves propagating through waveguides or other transmission media (for example, optical pulses through fiber-optic cables), or electrical signals transmitted through electrical wires.

The computer-readable program instructions described herein can be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the "C" language or similar programming languages. The computer-readable program instructions can be completely executed on a user's computer, partially executed on a user's computer, executed as a separate software package, partially executed on a user's computer and partially executed on a remote computer, or completely executed on a remote computer or a server. In cases where a remote computer is involved, the remote computer can be connected to a user's computer over any kind of networks, including a local area network (LAN) or a wide area network (WAN), or can be connected to an external computer (e.g., over the Internet by using an Internet service provider). In some implementations, an electronic circuit, for example, a programmable logic circuit, a field programmable gate array (FPGA), or a programmable logic array (PLA), is personalized by utilizing state information of computer-readable program instructions, and the electronic circuit may execute the computer-readable program instructions so as to implement various aspects of the present disclosure.

Various aspects of the present disclosure are described herein with reference to flowcharts and/or block diagrams of the method, the apparatus (system), and the computer program product according to implementations of the present disclosure. It should be understood that each block of the flowcharts and/or block diagrams and combinations of blocks in the flowcharts and/or block diagrams can be implemented by computer-readable program instructions.

These computer-readable program instructions may be provided to a processing unit of a general-purpose computer, a special-purpose computer, or another programmable data processing apparatus, thereby producing a machine, such that these instructions, when executed by the processing unit of the computer or another programmable data processing apparatus, produce a means for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner, such that the computer-readable medium having instructions stored includes an article of manufacture that includes instructions for implementing various aspects of the functions/actions specified in one or more blocks in the flowcharts and/or block diagrams.

The computer-readable program instructions can also be loaded onto a computer, another programmable data processing apparatus, or another device, so that a series of operating steps can be performed on the computer, another programmable data processing apparatus, or another device to produce a computer-implemented process. Therefore, the instructions executed on the computer, another programmable data processing apparatus, or another device implement the functions/actions specified in one or more blocks in the flowcharts and/or block diagrams.

The flowcharts and block diagrams in the accompanying drawings show the architectures, functions, and operations of possible implementations of systems, methods, and computer program products according to multiple implementations of the present disclosure. In this regard, each block in the flowcharts or block diagrams may represent a module, a program segment, or a part of an instruction that contains one or more executable instructions for implementing specified logical functions. In some alternative implementations, functions labeled in the blocks may also occur in an order different from that labeled in the accompanying drawings. For example, two successive blocks may actually be performed basically in parallel, or they may be performed in an opposite order sometimes, depending on the functions involved. It should also be noted that each block in the block diagrams and/or flowcharts and a combination of blocks in the block diagrams and/or flowcharts can be implemented using a dedicated hardware-based system for executing specified functions or actions, or can be implemented using a combination of dedicated hardware and computer instructions.

Various implementations of the present disclosure have been described above. The above description is illustrative but not exhaustive, and is not limited to the various implementations disclosed. Multiple modifications and variations will be apparent to those of ordinary skill in the art without departing from the scope and spirit of the illustrated various implementations. The selection of terms as used herein is intended to best explain the principles and practical applications of the various implementations or the improvements to technologies on the market, or to enable other persons of ordinary skill in the art to understand the implementations disclosed here.

What is claimed is:

1. A method for partition extending for a storage system, wherein the storage system comprises at least one partition, a partition of the at least one partition comprises a group of objects, and the method comprises:
dividing, by a system comprising a processor, the group of objects into a first group of objects and a second group of objects, wherein the dividing the group of objects comprises applying a hash function that identifies a number of bits in a hash value, wherein the number of bits in the hash value determines how to divide the group of objects according to different processes usable to divide the group of objects;
creating a first partition and a second partition based on the first group of objects and the second group of objects, wherein the first partition comprises the first group of objects, and the second partition comprises the second group of objects;
obtaining a partition index of the partition, wherein a group of nodes comprised in the partition index respectively represents metadata of the group of objects; and
generating a first partition index and a second partition index based on the partition index, wherein a first group of nodes comprised in the first partition index respectively represents metadata of the first group of objects, and a second group of nodes comprised in the second partition index respectively represents metadata of the first group of objects.

2. The method according to claim 1, wherein obtaining the partition index of the partition comprises:
flushing data in a memory table of the partition to a storage chunk corresponding to the partition in a storage chunk layer of the storage system; and
reading the partition index from the storage chunk.

3. The method according to claim 1, wherein generating the second partition index based on the partition index comprises: determining the second partition index based on nodes corresponding to the second group of objects in the partition index.

4. The method according to claim 3, wherein determining the second partition index comprises:
based on a copy on write process, reading the nodes corresponding to the second group of objects from the partition index;
updating the read nodes based on the second group of objects to write the updated nodes into the memory table of the second partition index; and
flushing the memory table of the second partition index to a storage chunk corresponding to the second partition in the storage chunk layer of the storage system to generate the second partition index.

5. The method according to claim 4, wherein determining the second partition index further comprises:
before reading the nodes corresponding to the second group of objects, stopping processing of an access request for the partition.

6. The method according to claim 5, wherein the partition index is an additional index, and generating the first partition index based on the partition index comprises:
after the partition index has been read, setting nodes representing metadata of objects in the second group of objects in the partition index to be invalid to generate the first partition index.

7. The method according to claim 6, further comprising: resuming processing of an access request for the storage system based on the first partition index and the second partition index.

8. The method according to claim 7, wherein resuming processing of the access request for the partition comprises:
determining an extended hash value of a target object involved in the access request based on the hash function associated with the partition;
determining a target partition where the target object is located from the first partition and the second partition based on the extended hash value; and
processing the access request based on an index of the target partition.

9. The method according to claim 1, wherein dividing the group of objects into the first group of objects and the second group of objects comprises: for an object in the group of objects,
determining an extended hash value of the object based on the hash function associated with the partition;
in response to a determination that the extended hash value is the same as the hash value of the object, classifying the object into the first group of objects, wherein a length of the hash value is less than that of the extended hash value; and
in response to a determination that the extended hash value is different from the hash value, classifying the object into the second group of objects.

10. The method according to claim 1, wherein the method is executed in a management process at a partition management node for managing the partition, and wherein the method is executed in response to at least any one of the following:
extension of a storage capacity of the storage system; and
extension of a parallel access capability of the storage system.

11. An electronic device, comprising:
at least one processor;
a volatile memory; and
a memory coupled to the at least one processor, wherein the memory has instructions stored therein, the instructions, when executed by the at least one processor, cause the device to execute actions relating to partition extension for a storage system, the storage system comprises at least one partition, a partition of the at least one partition comprises a group of objects, and the actions comprise:
dividing the group of objects into a first group of objects and a second group of objects, wherein the dividing the group of objects comprises applying a hash function that identifies a number of bits in a hash value, wherein the number of bits in the hash value determines how to divide the group of objects according to different defined processes to divide the group of objects;
creating a first partition and a second partition based on the first group of objects and the second group of objects, wherein the first partition comprises the first group of objects, and the second partition comprises the second group of objects;
obtaining a partition index of the partition, wherein a group of nodes comprised in the partition index respectively represents metadata of the group of objects; and
generating a first partition index and a second partition index based on the partition index, wherein a first group of nodes comprised in the first partition index respectively represents metadata of the first group of objects, and a second group of nodes comprised in the second partition index respectively represents metadata of the first group of objects.

12. The device according to claim 11, wherein obtaining the partition index of the partition comprises:
   flushing data in a memory table of the partition to a storage chunk corresponding to the partition in a storage chunk layer of the storage system; and
   reading the partition index from the storage chunk.

13. The device according to claim 11, wherein generating the second partition index based on the partition index comprises: determining the second partition index based on nodes corresponding to the second group of objects in the partition index.

14. The device according to claim 13, wherein determining the second partition index comprises:
   based on a copy on write process, reading the nodes corresponding to the second group of objects from the partition index;
   updating the read nodes based on the second group of objects to write the updated nodes into the memory table of the second partition index; and
   flushing the memory table of the second partition index to a storage chunk corresponding to the second partition in the storage chunk layer of the storage system to generate the second partition index.

15. The device according to claim 14, wherein determining the second partition index further comprises:
   before reading the nodes corresponding to the second group of objects, stopping processing of an access request for the partition.

16. The device according to claim 15, wherein the partition index is an additional index, and wherein generating the first partition index based on the partition index comprises:
   after the partition index has been read, setting nodes representing metadata of objects in the second group of objects in the partition index to be invalid to generate the first partition index.

17. The device according to claim 16, further comprising: resuming processing of an access request for the storage system based on the first partition index and the second partition index.

18. The device according to claim 17, wherein resuming processing of the access request for the partition comprises:
   determining an extended hash value of a target object involved in the access request based on a hash function associated with the partition;
   determining a target partition where the target object is located from the first partition and the second partition based on the extended hash value; and
   processing the access request based on an index of the target partition.

19. The device according to claim 11, wherein dividing the group of objects into the first group of objects and the second group of objects comprises: for an object in the group of objects,
   determining an extended hash value of the object based on a hash function associated with the partition;
   in response to a determination that the extended hash value is the same as a hash value of the object, classifying the object into the first group of objects, wherein a length of the hash value is less than that of the extended hash value; and
   in response to a determination that the extended hash value is different from the hash value, classifying the object into the second group of objects.

20. A computer program product tangibly stored on a non-transitory computer-readable medium and comprising machine-executable instructions for usage to perform partition extension in a storage system, wherein the storage system comprises partitions, a partition of the partitions comprises a group of objects, and wherein the machine-executable instructions are used to implement operations, comprising:
   dividing the group of objects into a first group of objects and a second group of objects, wherein the dividing the group of objects comprises applying a hash function that identifies a number of bits in a hash value, wherein the number of bits in the hash value determines how to divide the group of objects according to different ways to divide the group of objects;
   creating a first partition and a second partition based on the first group of objects and the second group of objects, wherein the first partition comprises the first group of objects, and the second partition comprises the second group of objects;
   obtaining a partition index of the partition, wherein a group of nodes comprised in the partition index respectively represents metadata of the group of objects; and
   generating a first partition index and a second partition index based on the partition index, wherein a first group of nodes comprised in the first partition index respectively represents metadata of the first group of objects, and a second group of nodes comprised in the second partition index respectively represents metadata of the first group of objects.

* * * * *